United States Patent
Mueller

[11] Patent Number: 5,595,256
[45] Date of Patent: Jan. 21, 1997

[54] ASSEMBLY BEARING FAVORABLE IN CRASH SITUATIONS

[75] Inventor: Robert Mueller, Mönsheim, Germany

[73] Assignee: Dr. Ing. h.c.F. Porsche AG, Weissach, Germany

[21] Appl. No.: 393,675

[22] Filed: Feb. 24, 1995

[30] Foreign Application Priority Data

Feb. 24, 1994 [DE] Germany ............... 44 05 904.3

[51] Int. Cl.[6] .................................. B60K 5/00
[52] U.S. Cl. ................ 180/232; 280/784; 296/189
[58] Field of Search .................. 180/232, 300, 180/312; 188/371; 280/784; 296/35.2, 189; 248/637

[56] References Cited

U.S. PATENT DOCUMENTS

| | | | |
|---|---|---|---|
| 2,084,080 | 6/1937 | D'Aubarede | 180/300 |
| 2,378,874 | 6/1945 | Trott . | |
| 3,774,712 | 11/1973 | Froumajou | 180/232 |
| 3,827,525 | 8/1974 | Felzer | 180/232 |
| 4,449,603 | 5/1984 | Langwieder et al. | 180/232 |
| 4,667,764 | 5/1987 | Sawada et al. | 180/300 |
| 5,074,374 | 12/1991 | Ohtake et al. | 180/312 |
| 5,251,932 | 10/1993 | Ide | 280/784 |
| 5,335,745 | 8/1994 | Goor | 280/784 |
| 5,477,938 | 12/1995 | Tsuji et al. | 280/784 |

FOREIGN PATENT DOCUMENTS

| | | |
|---|---|---|
| 395742 | 5/1933 | Belgium . |
| 00988401 | 1/1984 | European Pat. Off. . |
| 477654 | 4/1992 | European Pat. Off. . |
| 7237102 | 3/1976 | Germany . |
| 3117378C2 | 11/1982 | Germany . |
| 3301708C2 | 2/1984 | Germany . |
| 1-186429 | 7/1989 | Japan . |

*Primary Examiner*—Paul N. Dickson
*Attorney, Agent, or Firm*—Evenson, McKeown, Edwards & Lenahan, P.L.L.C.

[57] ABSTRACT

An assembly bearing structure of a motor vehicle which is favorable in crash situations includes a holding arrangement disposed on the vehicle body. This holding arrangement includes a carrying member supported on the vehicle body as well as an elastically connected longitudinal support which is provided with a catch device for a front-side end of a transmission case and has at least one energy-absorbing deformation area.

13 Claims, 4 Drawing Sheets

ASSEMBLY BEARING FAVORABLE IN CRASH SITUATIONS

BACKGROUND AND SUMMARY OF THE INVENTION

This invention relates to an assembly bearing structure which is favorable in crash situations and includes a holding arrangement disposed on a motor vehicle passenger car body.

From German Patent Document DE-33 01 708 C2, a motor vehicle is known which comprises a drive unit which is held on a cross member which, in the case of a crash largely takes over a reduction of impact energy by means of a deformation.

It is an object of the invention to provide an assembly bearing which ensures a secure carrying function of the drive unit and, at the same time, a longitudinal support which is designed to provide crash safety.

According to the invention, this object is achieved by providing an arrangement wherein the holding arrangement comprises a carrying member supported on the vehicle body as well as an elastically connected longitudinal support which is provided with a catch device for a front-side end of a transmission case and has at least one energy-absorbing deformation area.

The principal advantages achieved by means of the invention connected with one another and which permit a separation of functions. One component, which consists of a carrying member, takes over the carrying function, specifically the vibration-isolated bearing of the drive assembly on the vehicle body, and the other component, which consists of a longitudinal support, provides the energy absorption in the case of a crash by means of a plastic deformation.

The longitudinal support is connected with the carrying member by means of an elastic rubber bearing element which is held in a molded-on receiving device of the transmission case. For the operative connection with the longitudinal support in the case of a crash, the receiving device has a projecting nose which engages in a catch device of the longitudinal support and deforms it in an energy-absorbing manner. For this purpose, stability-reducing zones are formed in the longitudinal support which consist of creases, notches, bores or the like. These zones also have the effect that, when the assembly is stressed by a crash, it can swivel out downwards.

The carrying member essentially comprises a tongue which is transversely arranged in the vehicle and has end-side bearings. The longitudinal support with deformation zones which consists of a profiled sheet metal preform is held on this tongue by means of the elastic bearing.

Other objects, advantages and novel features of the present invention will become apparent from the following detailed description of the invention when considered in conjunction with the accompanying drawings.

DETAILED DESCRIPTION OF THE DRAWINGS

Figure 1:
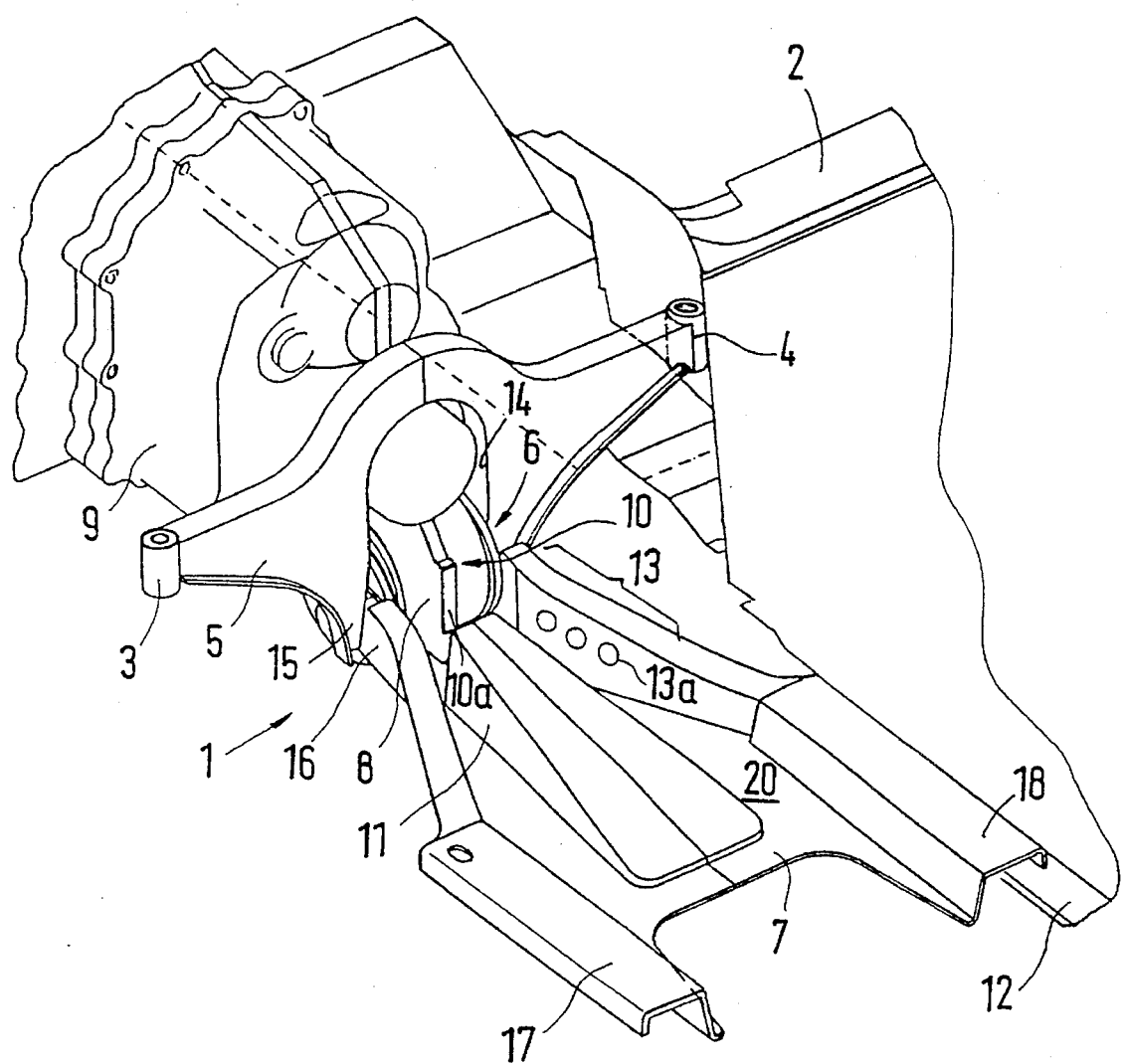
FIG. 1 is a schematic perspective representation of a holding arrangement with carrying member and longitudinal support, constructed according to the present invention.
Figure 2:
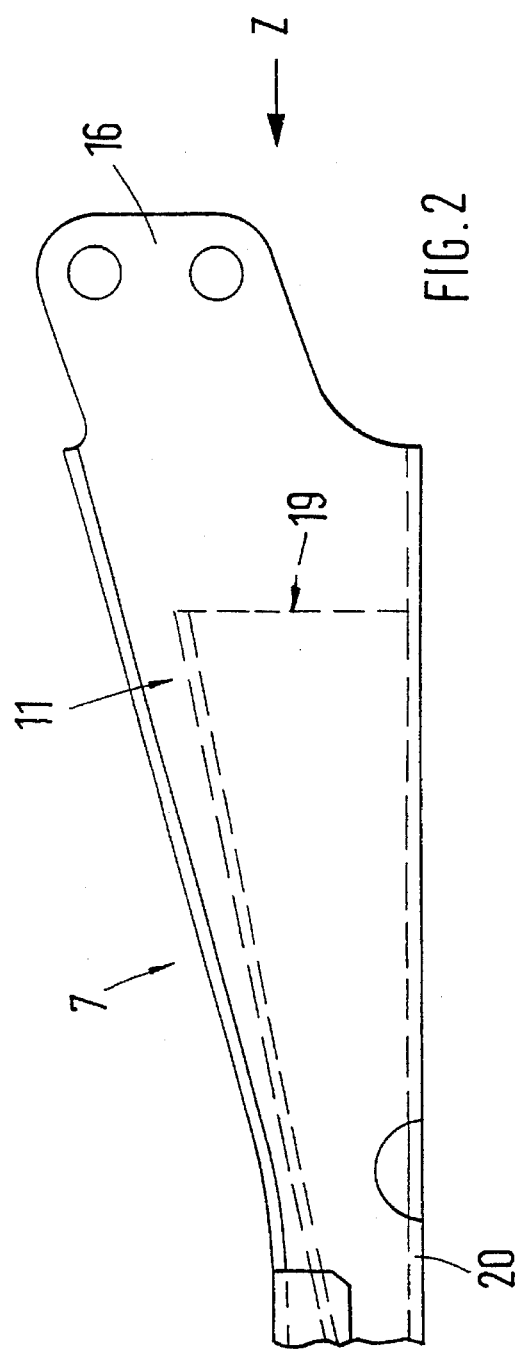
FIG. 2 is a lateral view of the longitudinal support of FIG. 1.
Figure 3:
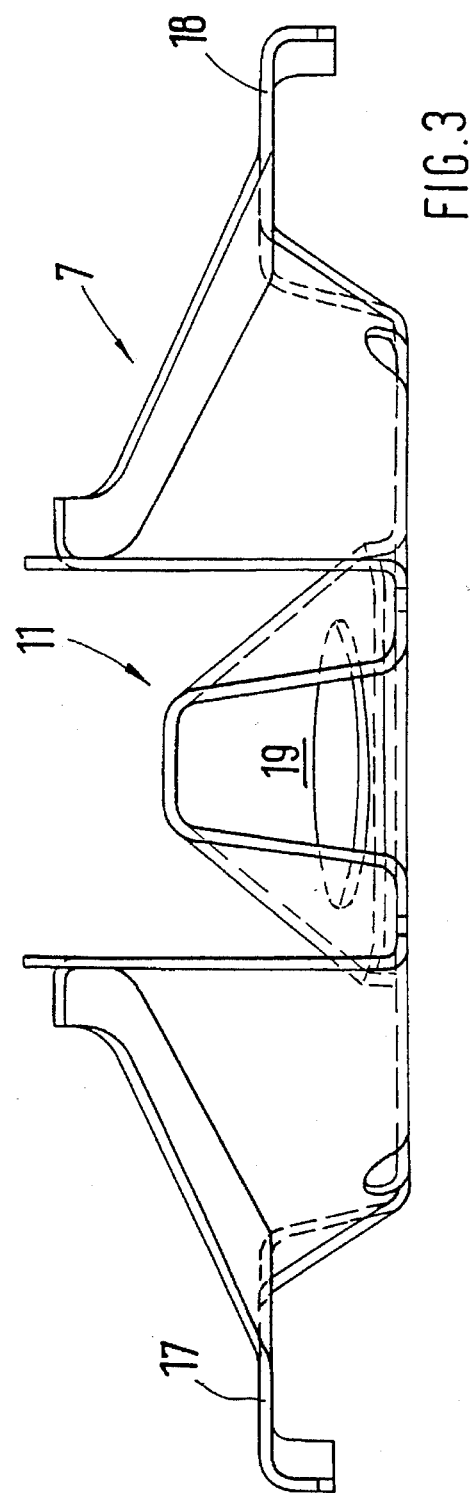
FIG. 3 is a view of the longitudinal support in the direction of the arrow Z of FIG. 2.

The assembly bearing comprises essentially a holding arrangement 1 which consists of a carrying member 5 supported on the vehicle body 2 in bearings 3, 4 and connected with a longitudinal support by means of a connecting bearing 6.

The connecting bearing 6, which is constructed as a rubber bearing element, is arranged in a molded-on receiving device 8 of a transmission case 9, which receiving device 8 has a projecting nose 10a which is directed toward a catch device 11 in the longitudinal support 7.

The longitudinal support 7 is preferably held in a vertical plane of the assembly on the vehicle body or on stiff side members of the vehicle body 12. The longitudinal support has stability-reducing zones 13 which are formed by creases, bores 13a, notches, corrugations, or the like. By means of these deformation zones 13, which are arranged in a targeted manner, the longitudinal support 7 can plastically deform in a defined manner in the longitudinal direction of the vehicle and can therefore absorb a portion of the impact energy acting from the assembly upon the vehicle body.

The energy-absorbing deformation of the longitudinal support 7 by way of the zones 13 takes place as soon as the springing excursion of the rubber bearing element 6 is used up or this rubber bearing element 6 is destroyed and the nose 10a engages with the catch device 11 of the longitudinal support 7.

The deformation of the longitudinal support 7 takes place in such a manner that the assembly presses downward in the close range of the passenger compartment.

The carrying member 5 comprises a so-called tongue which is transversely arranged in the vehicle and has the bearings 3 and 4 on its free ends. In a center recess 14 of the tongue, the rubber bearing element 6 is arranged, on the shaft 6A (FIG. 4–6) of which legs 15 of the carrying member 5 and legs 16 of the longitudinal support 7 are fastened on both sides.

The longitudinal support 7 is constructed as a sheet metal preform which has the catch device 11 between profiled lateral parts. The catch device 11 formed is constructed as a molding-on, or molded on part, which has a U-shaped cross-section and has an opening 19 which is directed toward the nose 10a. The mold part tapers in a wedge-shape toward the plane 20 of the plate 10a. In the profiled lateral parts 17, 18, the deformation zones 13 are provided, or in this area, the creases, holes 13a, notches are arranged separately or combined with one another.

Figure 4:
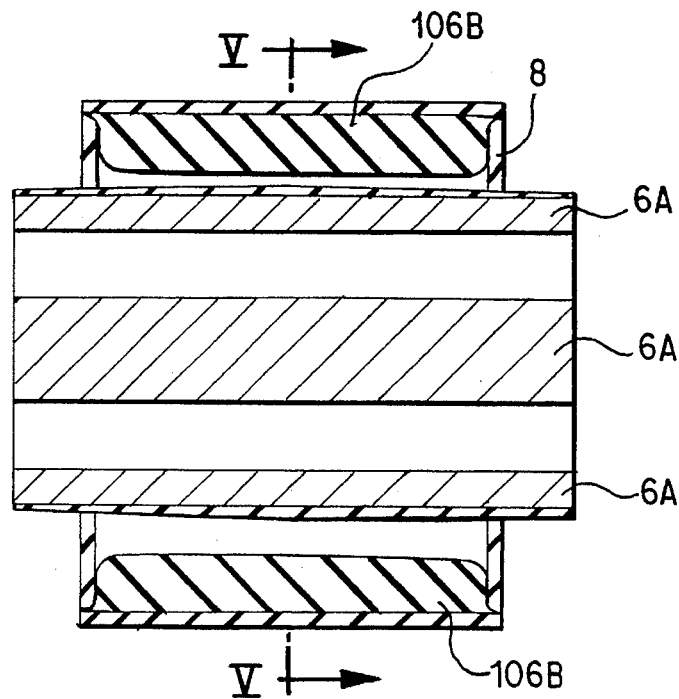
FIG. 4 is a cross-sectional view of a preferred embodiment of an elastic connecting bearing for connecting the longitudinal support and carrying member of FIGS. 1–3.
Figure 5:
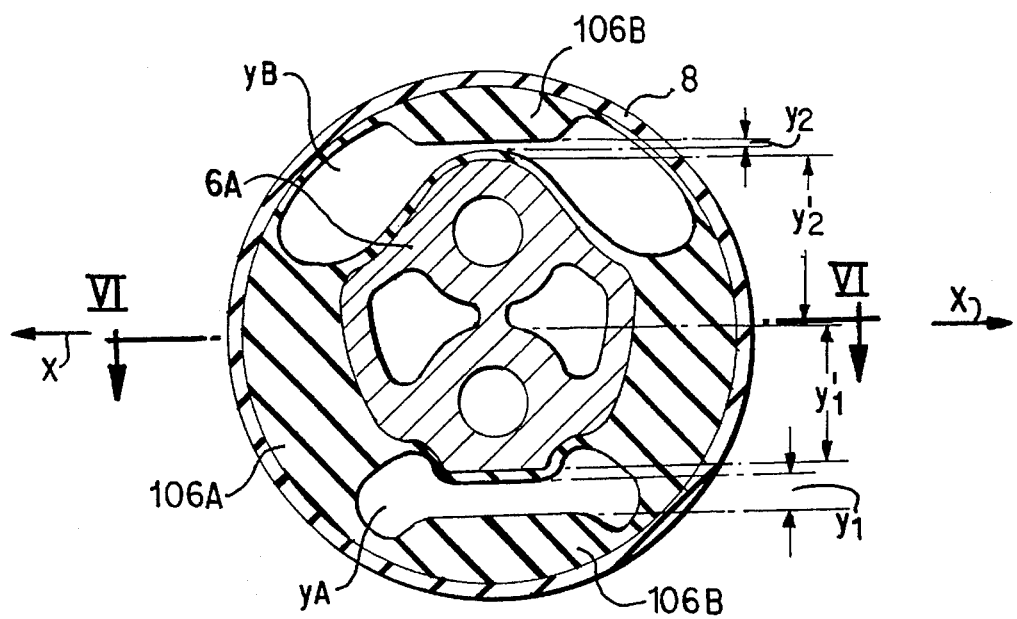
FIG. 5 is a cross-sectional view taken along line V—V of FIG. 4.
Figure 6:
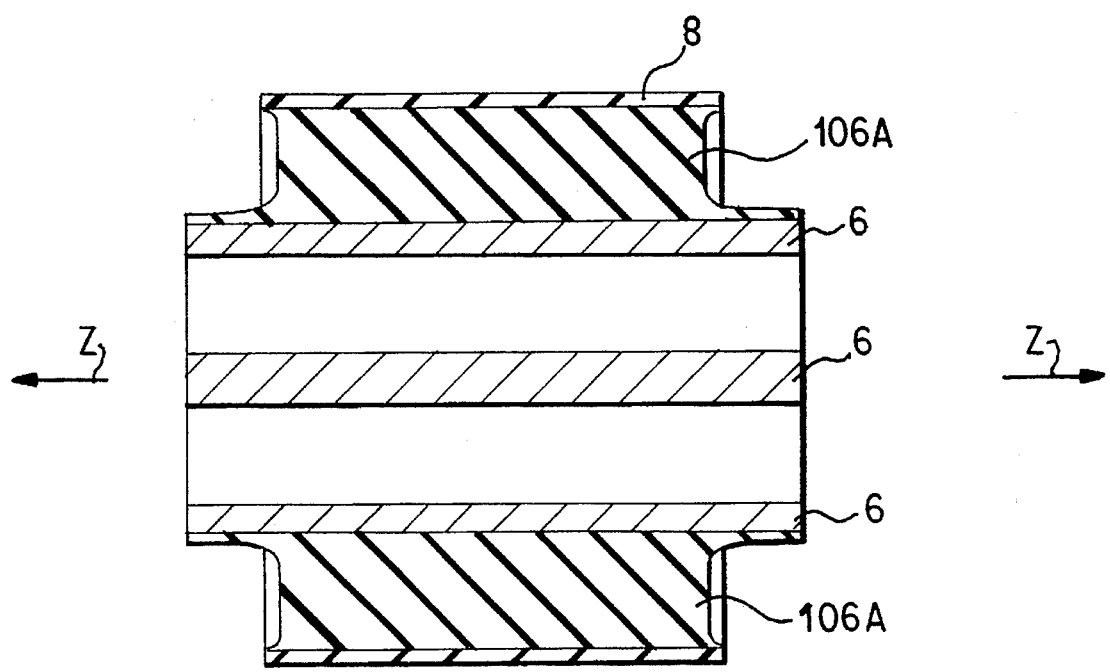
FIG. 6 is a cross-sectional view taken along line VI—VI of FIG. 5.

FIGS. 4 to 6 illustrate a preferred embodiment of an elastic bearing 6 for use with the invention. Rubber elastic material 106 includes a section 106A fixed to both the molded on part 8 and shaft 6A and filling the space between these parts 8 and 6A, thus serving to form a relatively hard elastic resistance to movements in the vehicle horizontal travel directions depicted by arrow X. Rubber elastic material section 106B is fixed to the part 8 and is spaced by distance $Y_1$, in the unstressed condition from the facing shaft and elastic material coating due to the cutout $Y_A$ at the bottom of the bearing. A corresponding but differently shaped $Y_B$ is located radially opposite $Y_A$ at the bottom of the bearing. Due to cutouts $Y_A$ and $Y_B$, the elastic material has (i) a softer elastic resistance in the vertical direction than in the horizontal driving direction X—X, and (ii) different resistance characteristics depending on the relative up and down movement of parts 6A and 8.

In FIG. 5 distances $Y'_2$ and $Y'_1$ depict the distances between the center of shaft 6A an the part 8 in the unstressed condition. This asymmetric configuration provides for different elasticity characteristics for relative upward and downward movements. For example, due to the small spacing $Y_2$, the gap would be closed and the resistance increased for a smaller movement than would be the case for the movement in the opposite direction due to the larger gap $Y_1$.

FIG. 6 is a sectional view along line VI—VI of FIG. 5. Arrows Z—Z depict that the elastic bearing assembly permits some elastic bearing movements in the axial direction Z—Z of shaft 6A.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Assembly bearing structure for a motor vehicle, having a transmission case with a front-side end, which is favorable in crash situations, comprising a holding arrangement disposed on a vehicle body, wherein the holding arrangement comprises a carrying member supported on the vehicle body as well as an elastically connected longitudinal support which is provided with a catch device for the front-side end of the transmission case, said longitudinal support having at least one energy-absorbing deformation area; and wherein the deformation area of the longitudinal support is formed by at least one stability-reducing zone which is arranged in such a manner that, when stressed by a crash, the transmission case is guided to swivel out in a downward direction of the vehicle body.

2. Bearing structure according to claim 1, wherein the stability-reducing zone is formed of at least one of separately arranged creases and bores.

3. Assembly bearing structure for a motor vehicle, having a transmission case with a front-side end, which is favorable in crash situations, comprising a holding arrangement disposed on a vehicle body, wherein the holding arrangement comprises a carrying member supported on the vehicle body as well as an elastically connected longitudinal support which is provided with a catch device for the front-side end of the transmission case, said longitudinal support having at least one energy-absorbing deformation area; and wherein the front-side end of the transmission case is provided with a nose, and wherein the catch device has a receiving device for guiding movement of the nose in the event of a driving direction crash situation.

4. Bearing structure according to claim 3, wherein the deformation area of the longitudinal support is formed by at least one stability-reducing zone which is arranged in such a manner that, when stressed by a crash, the transmission case is guided to swivel out in a downward direction.

5. Bearing structure according to claim 3, wherein the carrying member comprises a tongue which is arranged transversely in the vehicle body and has bearings on two free ends, and a center recess for receiving an elastic connecting bearing for the longitudinal support.

6. Bearing structure to claim 5, wherein the connecting bearing is held in a molded-on receiving device of the transmission case which has the nose projecting from the receiving device.

7. Assembly bearing structure for a motor vehicle, having a transmission case with a front-side end, which is favorable in crash situations, comprising a holding arrangement disposed on a vehicle body, wherein the holding arrangement comprises a carrying member supported on the vehicle body as well as an elastically connected longitudinal support which is provided with a catch device for the front-side end of the transmission case, said longitudinal support having at least one energy-absorbing deformation area; and wherein the deformation area of the longitudinal support is formed by at least one stability-reducing zone, said zone including means for guiding the transmission case in a downward direction of the vehicle body when stressed by a crash.

8. Assembly bearing structure for a motor vehicle, having a transmission case with a front-side end, which is favorable in crash situations, comprising a holding arrangement disposed on a vehicle body, wherein the holding arrangement comprises a carrying member supported on the vehicle body as well as an elastically connected longitudinal support which is provided with a catch device for the front-side end of the transmission case, said longitudinal support having at least one energy-absorbing deformation area; and wherein the carrying member comprises a tongue which is arranged transversely in the vehicle body and has bearings on two free ends, and a center recess for receiving an elastic connecting bearing for the longitudinal support.

9. Bearing structure according to claim 8, wherein the connecting bearing consists of a rubber bearing element which has an elastic springing excursion in the longitudinal direction of the vehicle body which is followed by a plastic deformation path of the longitudinal support.

10. Bearing structure according to claim 9, wherein the catch device has a receiving device for the front-side end of the transmission case provided with a nose.

11. Bearing structure according to claim 10, wherein the longitudinal support comprises a sheet metal preform with bearing receiving legs and adjoining profiled lateral parts between which the catch device is arranged, the catch device having a U-shaped cross-section, and the receiving device is constructed as an opening directed toward the nose.

12. Bearing structure according to claim 11, wherein the at least one deformation area is formed in an area of the lateral parts which adjoin the legs, and wherein end areas of the lateral parts can be fastened to a stiff body structure of the vehicle body.

13. Bearing structure according to claim 8, wherein the connecting bearing has asymmetrical elastic bearing characteristics.

* * * * *